Figure 2:
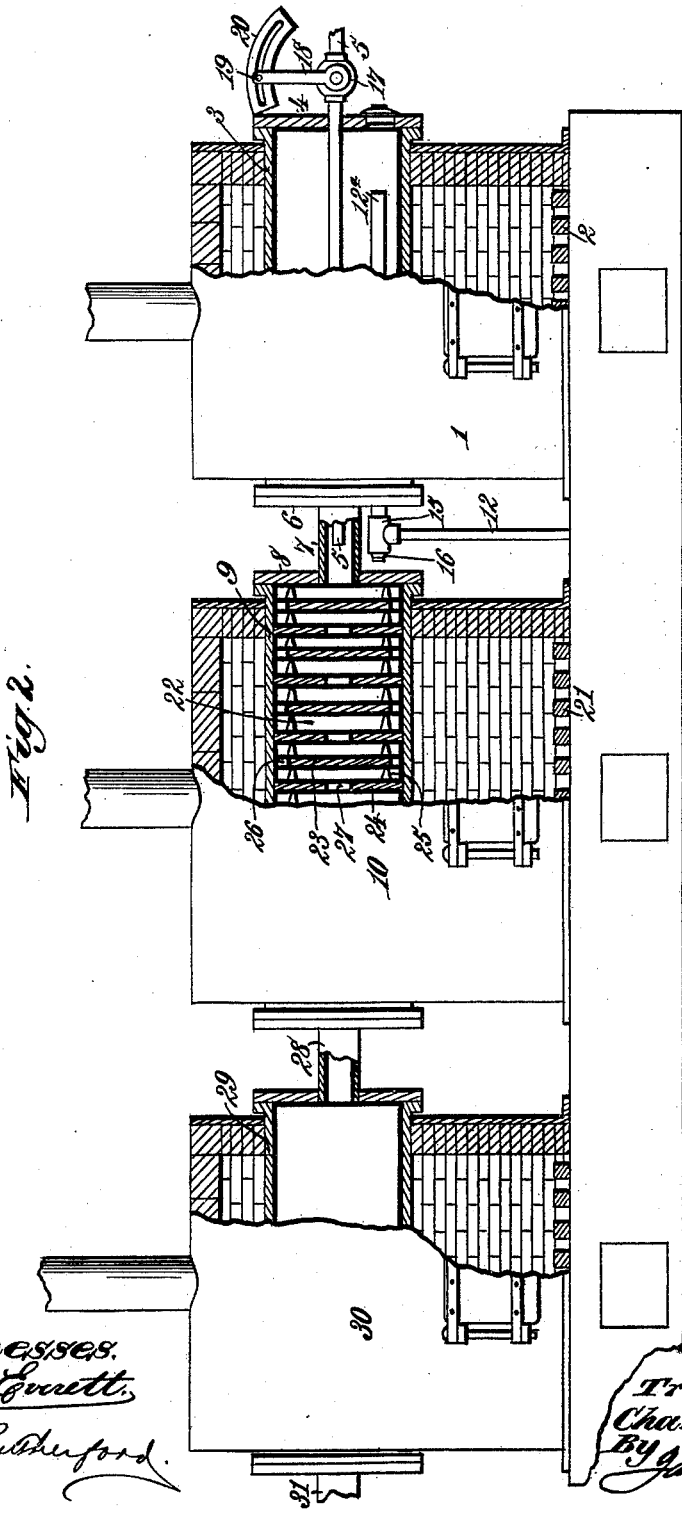

(No Model.) 3 Sheets—Sheet 1.
T. T. PROSSER & C. H. WILDER.
MANUFACTURE OF GAS.
No. 462,161. Patented Oct. 27, 1891.
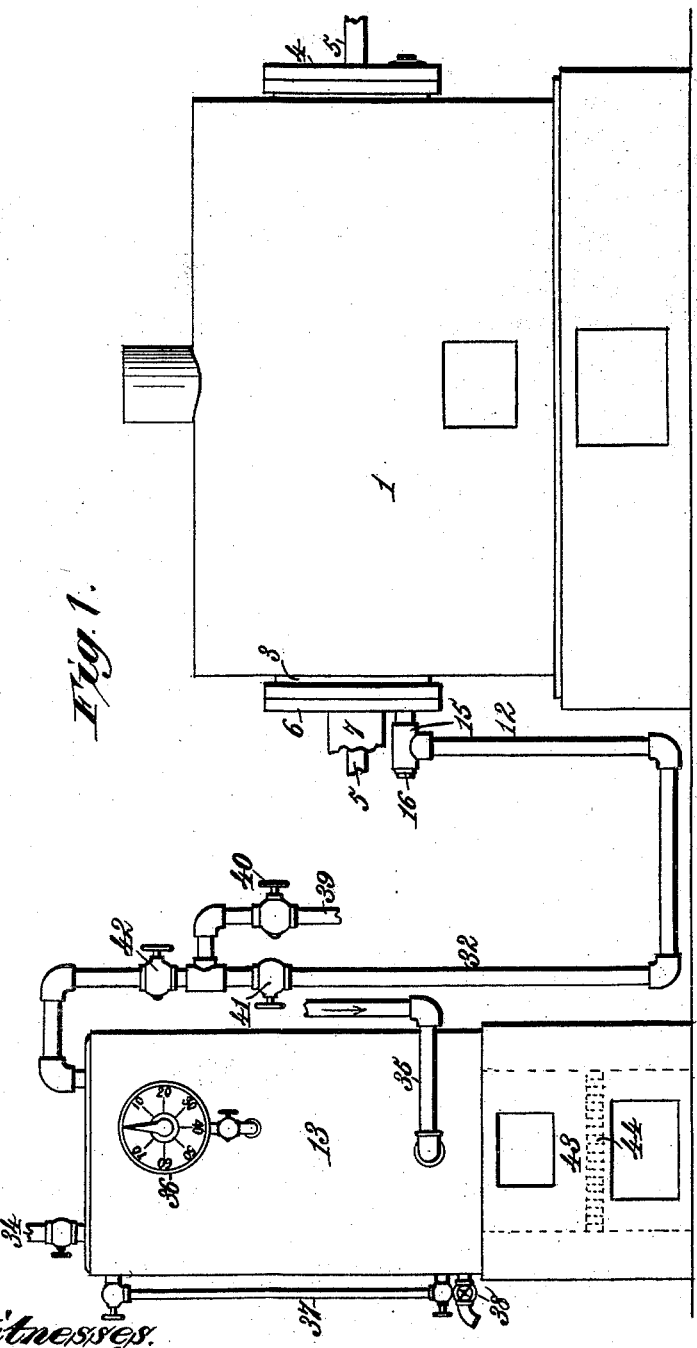
Witnesses.
Inventors.
Treat T. Prosser
Charles H. Wilder.
By James L. Norris.
Atty.

(No Model.) 3 Sheets—Sheet 2.

T. T. PROSSER & C. H. WILDER.
MANUFACTURE OF GAS.

No. 462,161. Patented Oct. 27, 1891.

Witnesses.
Robt Emrett
J. A. Rutherford

Inventors.
Treat T. Prosser
Charles H. Wilder.
By James L. Norris.
Atty.

(No Model.) 3 Sheets—Sheet 3.
T. T. PROSSER & C. H. WILDER.
MANUFACTURE OF GAS.
No. 462,161. Patented Oct. 27, 1891.
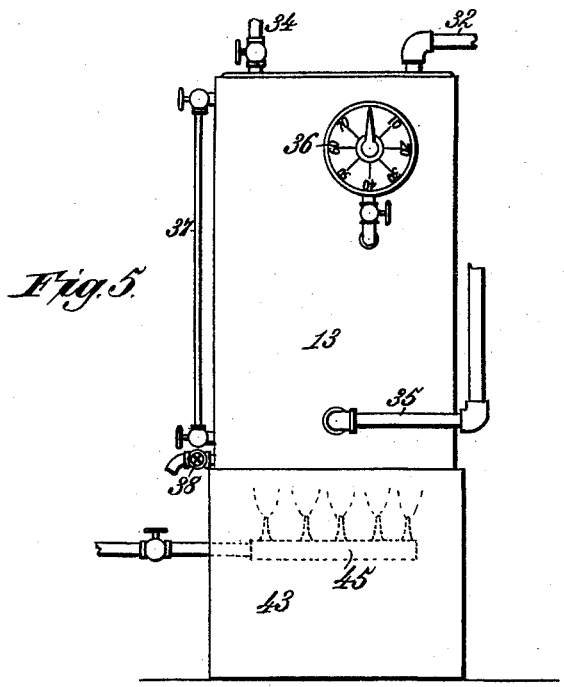
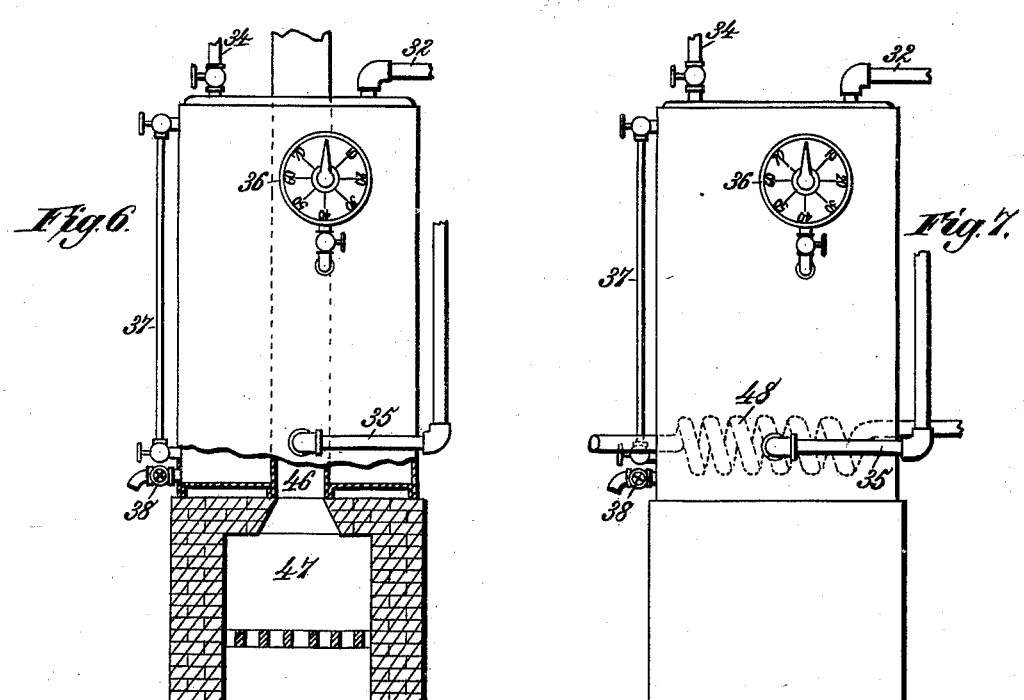

UNITED STATES PATENT OFFICE.

TREAT. T. PROSSER AND CHARLES H. WILDER, OF BOSTON, MASSACHUSETTS, ASSIGNORS TO CHARLES H. WILDER, OF SAME PLACE, AND LUKE A. WILDER, OF CHICAGO, ILLINOIS.

MANUFACTURE OF GAS.

SPECIFICATION forming part of Letters Patent No. 462,161, dated October 27, 1891.

Application filed April 7, 1891. Serial No. 388,002. (No model.)

*To all whom it may concern:*

Be it known that we, TREAT. T. PROSSER and CHARLES H. WILDER, citizens of the United States, residing at Boston, in the county of Suffolk and State of Massachusetts, have invented new and useful Improvements in the Manufacture of Gas, of which the following is a specification.

This invention relates to the manufacture of gas for illuminating and heating purposes by vaporizing oil in a vaporizing-retort and mixing it with heated atmospheric air in an air and vapor mixing retort.

The object of the invention is to provide a novel method or process of feeding the oil to the vaporizing-retort, whereby sediment and other foreign matter contained in the oil is precipitated or deposited prior to the entrance of the oil into the vaporizing-retort.

The invention also has for its object to provide a novel method of cleaning or purifying the oil and subsequently feeding it uniformly to the vaporizing-retort, whereby Lima oil can be practicably utilized in the manufacture of gas for illuminating and heating purposes without the residuum in the retorts or offensive odors from the oil-vapor, while obtaining a larger proportion of gas from a given quantity of oil.

The invention also has for its object to provide novel means for feeding the oil to the vaporizing-retort through the medium of hydrostatic pressure on a body of heated water, whereby the oil is not only fed uniformly to the retort, but sediment and other foreign matter is deposited before the oil enters the retort.

These objects are accomplished in the manner and by the means hereinafter described and claimed, reference being made to the accompanying drawings, in which—

Figure 1 is a sectional side elevation of an apparatus designed for carrying our invention into practice. Fig. 2 is a broken side elevation showing the vaporizing-retort and the heated-water tank for feeding the oil thereinto. Figs. 3 and 4 are detail side views of the diaphragms for subdividing the air and vapor mixing retort. Fig. 5 is a detail sectional view showing a modified arrangement for heating the oil-feeding water-tank. Figs. 6 and 7 are similar views showing other modifications for heating the oil-feeding water-tank.

In order to enable those skilled in the art to make and use our invention, we will now describe the same in detail, referring to the drawings, wherein—

The numeral 1 indicates a furnace structure having a fire-grate 2 and containing a horizontal vaporizing-retort 3, projecting from the end walls of the furnace structure, and through the end 4 of which retort enters an air-pipe 5. The other end 6 of said retort is provided with a pipe 7, of larger diameter than the air-pipe 5, and this pipe 7 communicates with the end 8 of a second or air and gas mixing retort 9, arranged in a second furnace 10, the air-pipe 5 having its open end terminating in the pipe 7. Through the end 6 of the retort 3 enters an oil-feed pipe 12, which carries the oil from the oil-feeding water-tank 13, such feed-pipe being provided with a horizontal branch $12^a$, which terminates within the retort, its open end lying, preferably, somewhat nearer the end 4 than the opposite end 6. In the pipe 12, at the coupling 15 is placed a plug 16 to enable the oil-pipe $12^a$ to be cleansed. In the air-pipe 5, outside the retort 3, is located a cock 17 for regulating the volume of air, said cock having a lever 18, which is provided with a pin or point 19, moving over a segmental scale 20, by which the volume of air admitted may be graduated.

The second or air and vapor mixing retort 9, which is connected with the vaporizing-retort by the pipe 7, is heated through the medium of a grate 21, similar in all essential respects to that in the furnace structure 1. This second retort, while it is of the same general form as the retort 3, is usually made somewhat longer, and is divided interiorly into a series of chambers 22 by transverse diaphragms or partitions 23 and 24. Each of these diaphragms is provided with nipples or similar projections 25, whereby they are retained at a suitable distance one from another to form the chambers 22. The diaphragms 23, which alternate with the diaphragms 24, are cut away upon their edges to form peripheral openings 26, as shown in Fig. 3, while each of the diaphragms 24 is provided with a central opening 27. In this manner it will readily be seen that the vapors of the oil and the air passing to the retort 9 will be compelled to pass through the openings 26 and thence through the central openings 27 alternately, thereby effecting a complete and thorough admixture of the air and vapor, thus forming a fixed gas. From the second or air and vapor mixing retort 9 this gas passes by way of a pipe 28 into a third or gas-reheating retort 29, consisting of an expanded chamber heated by any suitable form of furnace 30. In this third retort the fixed gas is submitted to a further temperature, whereby any substances not fully volatilized are thrown down prior to their entrance into the gas-holder. This third retort is connected with the gas-holder by a pipe 31. The entire internal surfaces of the several retorts, as well as the diaphragms 23 and 24 and the surfaces of all metallic parts of the retorts, are covered or coated with a paste-like mixture of plumbago and molasses. The heat converts the paste into a fixed carbon, which is practically indestructible and renders the retorts more durable, while improving the gas and enabling a larger proportion to be obtained from a given quantity of oil.

The oil-feeding pipe 12 is connected by a branch 32 with the top of the tank 13, heretofore mentioned, said tank being provided with an oil-supply pipe 34 for filling the tank and with a pipe 35, having a vertical branch by which the necessary hydrostatic column is supplied for the feed-pressure, said pressure being indicated by a gage 36, while the quantity of oil in the reservoir is shown by a gage-tube 37. A cock 38 is attached at the bottom of the tank to permit the withdrawal of the water.

The branch 32 of the oil-feeding pipe 12 has an auxiliary branch 39, provided with a cock 40, through which the oil may flow when testing the quality by running it into an empty measure. In the branch pipe 32 is placed a cock 41 below the point of union of the auxiliary branch 39 and a second cock 42 above said point. When the cock 42 is properly adjusted, the lower cock 41 is opened and the cock 40 in the auxiliary branch is closed. When it is necessary to close the feed, the cock 41 is closed and the cock 42 left open ready for operation whenever the cock 41 shall be again opened. In this manner the cock 42 is only used for adjusting the feed of the oil. Both the oil-supply and water-supply pipes 34 and 35 are provided with cocks for closing them, said cock in pipe 35 not being shown in the drawings.

The tank 13 serves to contain a body of water, which is constantly acted upon by the column of water in the pipe 35, and therefore the oil floating on the water is uniformly fed to the vaporizing-retort by the hydrostatic pressure of the column of water.

The oil-feeding water-tank is heated by any suitable heater for the purpose of heating the water therein, whereby the oil is heated by direct contact with the water. The action of the heat is such that sediment and other foreign matter contained in the oil are precipitated or deposited in the water-tank, from which it can be removed through the medium of the waste-cock 38. By this means the oil is purified or deprived of all sediment prior to its entrance into the oil-feeding pipe, and therefore the collection of sediment in the pipe is entirely avoided, which is an important feature, since deposits in the pipe connections between the tank and retort would materially interfere with the perfect operation of the apparatus as a whole. The oil, being heated by direct contact with heated water, is prevented from rising in temperature to a dangerous degree.

In Fig. 2 the oil-feeding water-tank 13 is heated through the medium of a suitable furnace structure 43, supporting the tank and having a fire-place and a grate 44.

In Fig. 5 the tank is supported by a suitable structure containing a gas or oil burner 45, comprising a gang of burner tips or jets.

In Fig. 6 the tank is provided with a vertical heating-flue 46, opening at its lower end into a furnace structure 47, which may contain a fire-place and grate, as in Fig. 2, or a gas or oil burner, as in Fig. 5.

In Fig. 7 the tank is heated by a coil 48, through which a heating-fluid is caused to flow.

We do not of course confine ourselves to any special contrivances for heating the body of water on which the oil floats, as this can be accomplished through the medium of any devices suitable for the conditions required.

By feeding the oil as described the lighter and most volatile portion is constantly removed and all danger of explosion is avoided, and by passing the air-pipe entirely through the vaporizing-retort the air and oil-vapor are heated to about the same temperature, while by mingling the heated air with the oil-vapor in transit to the air and vapor mixing retort the expansion due to their different capacities for the absorption of heat is fully provided for.

Having thus described our invention, what we claim is—

1. In the manufacture of gas from hydrocarbon oils, the method or process herein described of purifying the oil and feeding it to a vaporizing-retort, which consists in heating the oil by contact with a body of heated water subject to hydrostatic pressure and forcing the heated oil to a vaporizing-retort, substantially as set forth.

2. The method or process herein described of manufacturing gas from hydrocarbon oils, which consists in heating the oil by direct contact with a body of heated water, forcing the heated oil to a vaporizing-retort by hydrostatic pressure on the body of heated water, and mixing heated atmospheric air with the oil-vapor, substantially as set forth.

3. In an apparatus for the manufacture of gas, the combination, with a vaporizing-retort and an air-pipe extending thereinto, of an oil-feeding water-tank having a pipe connection at its top portion with the interior of the vaporizing-retort, a heater for heating the body of water in the tank, a pipe for delivering the oil upon the surface of the heated water, and a pipe for containing a column of water to subject the body of heated water to hydrostatic pressure for feeding the oil, substantially as described.

In testimony whereof we have hereunto set our hands and affixed our seals in presence of two subscribing witnesses.

TREAT. T. PROSSER. [L. S.]
CHARLES H. WILDER. [L. S.]

Witnesses:
S. B. WILCOX,
LUKE A. WILDER.